(12) United States Patent
Knauf

(10) Patent No.: US 6,279,409 B1
(45) Date of Patent: Aug. 28, 2001

(54) WIPER BEARING

(75) Inventor: Richard Knauf, Roppenheim (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/380,338

(22) PCT Filed: Sep. 17, 1998

(86) PCT No.: PCT/DE98/02752

§ 371 Date: Sep. 3, 1999

§ 102(e) Date: Sep. 3, 1999

(87) PCT Pub. No.: WO99/36299

PCT Pub. Date: Jul. 22, 1999

(30) Foreign Application Priority Data

Jan. 16, 1998 (DE) .............................................. 198 01 296

(51) Int. Cl.⁷ ................................................. F16H 21/16
(52) U.S. Cl. .......................................... 74/25; 15/250.34
(58) Field of Search ............................ 74/25; 15/250.21, 15/250.34, 250.352

(56) References Cited

U.S. PATENT DOCUMENTS

| | | | | |
|---|---|---|---|---|
| 3,808,629 | * | 5/1974 | Druseikis | 15/250.17 |
| 5,186,064 | * | 2/1993 | Matsumoto et al. | 74/47 |
| 5,890,256 | * | 4/1999 | Eustache | 15/250.21 |

FOREIGN PATENT DOCUMENTS

| | | |
|---|---|---|
| 40 07 940 C1 | 8/1991 | (DE) . |
| 2 646 643 | 11/1990 | (FR) . |
| 2 729 351 | 7/1996 | (FR) . |

* cited by examiner

*Primary Examiner*—David Fenstermacher
(74) *Attorney, Agent, or Firm*—Michael J. Striker

(57) ABSTRACT

A wiper bearing has a bearing shell and a shaft, which is received by the bearing shell and is connected at one point to a drive mechanism and has a receptacle for wiper arm. The bearing shell concentrically grips a region of the shaft and forms a first axis, which forms an angle with a second axis that extents through a region having a receptacle of the shaft.

4 Claims, 3 Drawing Sheets

WIPER BEARING

BACKGROUND OF THE INVENTION

The invention is based on a wiper bearing. Known wiper bearings of this generic type have a shaft, which is seated in a bearing structurally connected to the frame and which transmits a pendulum motion, generated by an electric motor drive mechanism via a crank drive, to a wiper arm and thus to a wiper blade resting on a window. Since particularly in late-model cars the windshields often have radii of curvature that vary considerably over the pendulum range of the wiper, an optimal orientation of the wiper blade to the window surface, which to assure a dragging motion should be as vertical to the window as possible, is not always attainable. It has therefore already been proposed that the axis of the wiper shaft be oriented at a specified angle relative to the window surface. As a result, a vertical orientation of the wiper blade is attained at least for a middle region. The orientation of the wiper blade over the full wiping region, however, still remains unsatisfactory.

SUMMARY OF THE INVENTION

In keeping with these objects, one feature of present invention resides, briefly stated, in a wiper bearing which is a further improvement of the existing wiper bearings.

In keeping with these objects, one feature of present invention resides, briefly stated, in that the bearing shell concentrically grips a region of the shaft and forms a first axis, which forms an angle with a second axis extending through a region having a receptacle of the shaft.

The wiper bearing with the characteristics of the present invention has the advantage over the prior art that the orientation of the wiper blade to the window surface is made possible over a much larger area of the wiper-swept field. For instance, by suitable orientation of the first or second axis, optimal conditions are possible at both turning points, or at one turning point and in a parking position, or in a region in the vicinity of the turning points.

Further advantageous features are possible by means of the characteristics of the dependent claims. By means of a kinked, curved or cranked course of the shaft, for instance, adaptations can be made to conditions in the region of transition from the windshield to the hood of the car. If the wiper shaft axis that passes through the receptacle of the wiper arm forms an angle with the second axis, still another option for optimization is presented.

BRIEF DESCRIPTION OF THE DRAWINGS

In the drawing, exemplary embodiments of the invention are shown that are described in further detail in the ensuing description.

DESCRIPTION OF THE PREFERRED EMBODIMENTS

Figure 1:
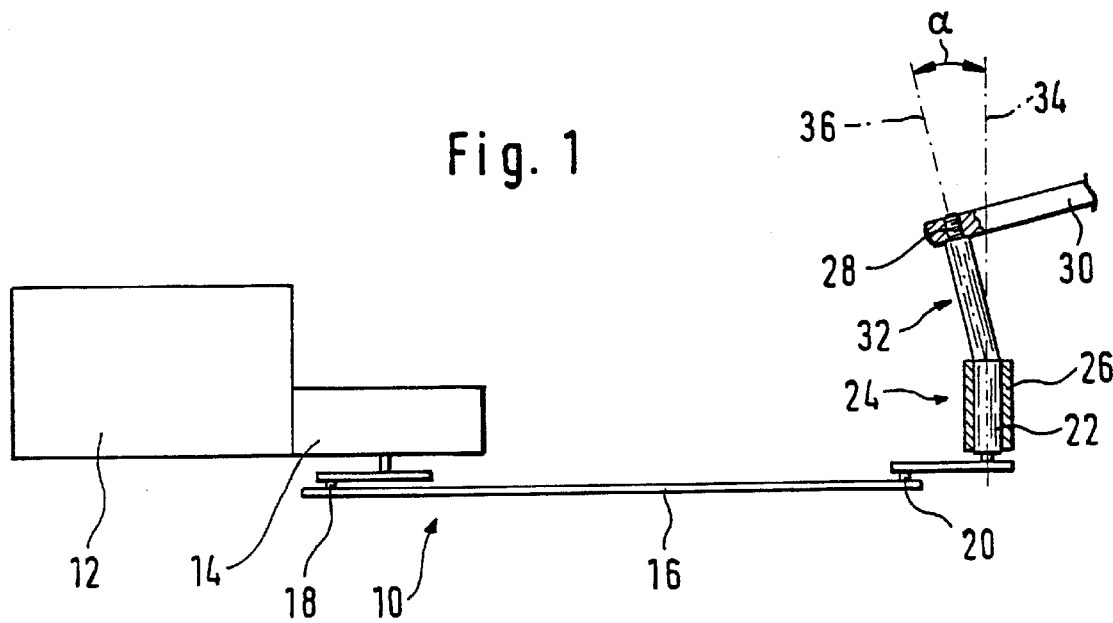
FIG. 1 schematically shows a first exemplary embodiment.

In FIG. 1, a wiper system 10 is shown, which has an electric motor 12 with a gear 14, which transmits a pendulum motion to a shaft 22 via two crank gears 18 and 20 that are connected by means of a crank rod 16. The shaft 22 is concentrically received, in a region 24, by a bearing shell 26 structurally connected to the frame, and it protrudes out of the bearing shell 26 with a region 32 that has a receptacle 28 for a wiper arm 30.

The two regions 24 and 32 have a first and second axis 34 and 36, respectively, which form an angle with one another. The axis 34 passes through the bearing shell 26 structurally connected to the frame, and is thus likewise solid with the frame. Thus during wiper operation, the axis 36 executes a tumbling motion extending over a conical surface. The two regions 24 and 32 of the shaft have a kink in the region of transition between them.

Figure 2:
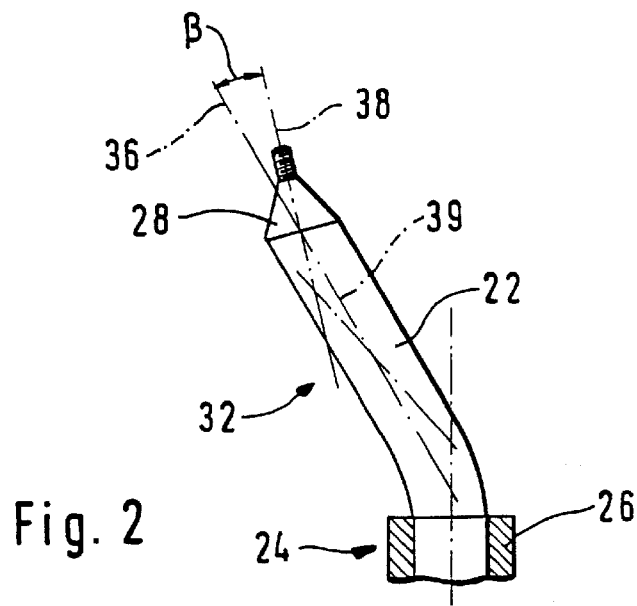
FIG. 2 shows part of the shaft of FIG. 1 in a variant and on a larger scale; and, FIG. 3 shows a third exemplary embodiment and, FIG. 4 shows a fourth exemplary embodiment.

In FIG. 2, a variant of the shaft 22 is shown whose region 32 here has a curved course, beginning at the region 24 surrounded by the bearing shell 26. The receptacle 28 for the wiper arm 30 has a third axis 38, which forms an angle with the axis 36. During wiper operation, the axis 36 here likewise executes a tumbling motion extending over a conical surface.

In an exemplary embodiment indicated by dot-dash lines in FIG. 2, the region 32 of the shaft 22 can also have a cranked course 39, whose cranked bend then makes a transition to the receptacle 28.

Figure 3:
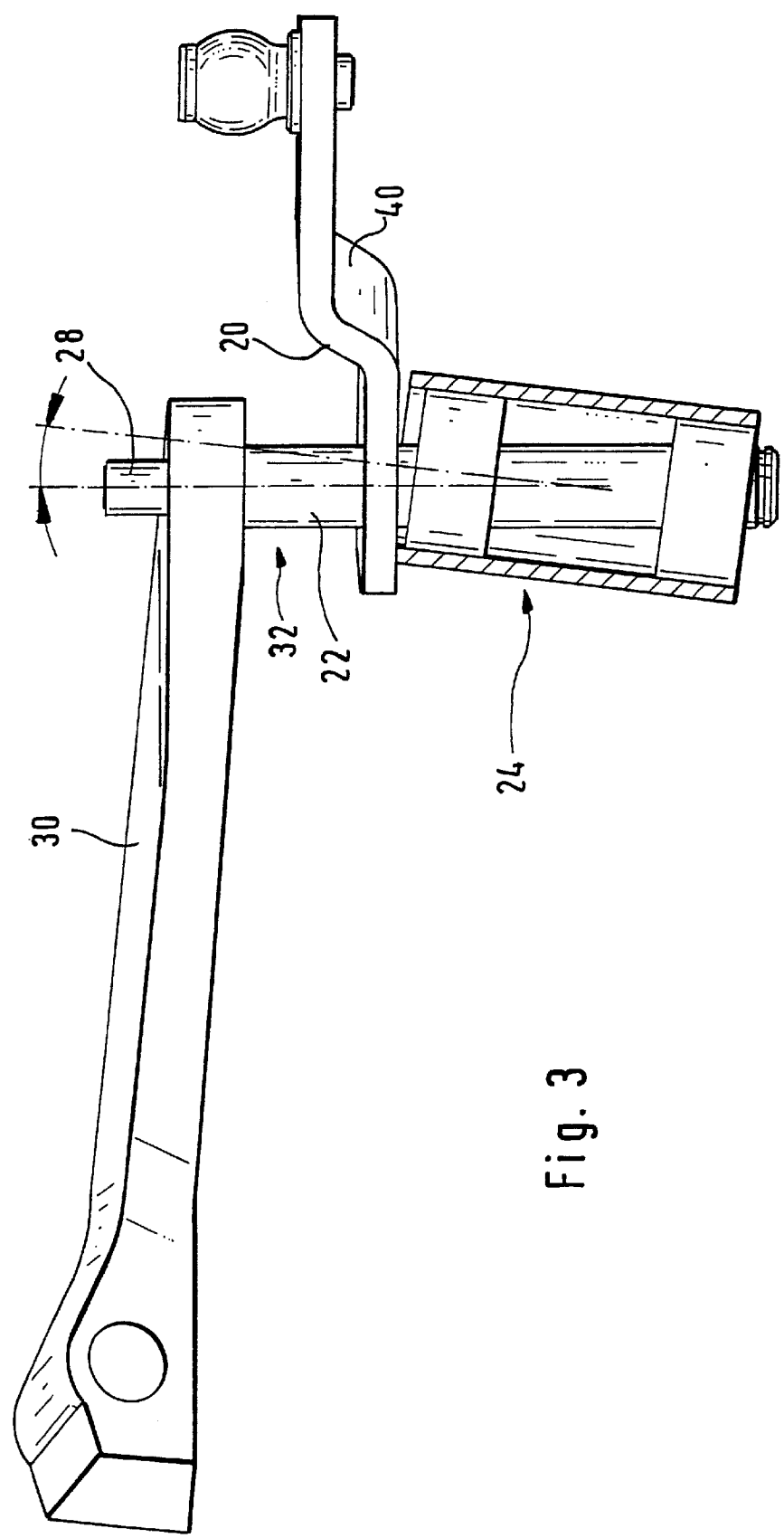

In FIG. 3, a second exemplary embodiment is shown, in which in contrast to the exemplary embodiment of FIG. 1 the crank drive 20 is not located on the side of the shaft 22 opposite the receptacle 28. A crank arm 40 here engages the transition between the regions 24 and 32, so that the bearing, in a manner structurally connected to the frame, of the shaft 22 is located below, and the region of the shaft that executes the pendulum motion is located above, the crank arm 40. In this way, the crank drive can be guided directly under the hood over the engine compartment, which under some circumstances can be favorable with a view to a low-height wiper system.

Figure 4:
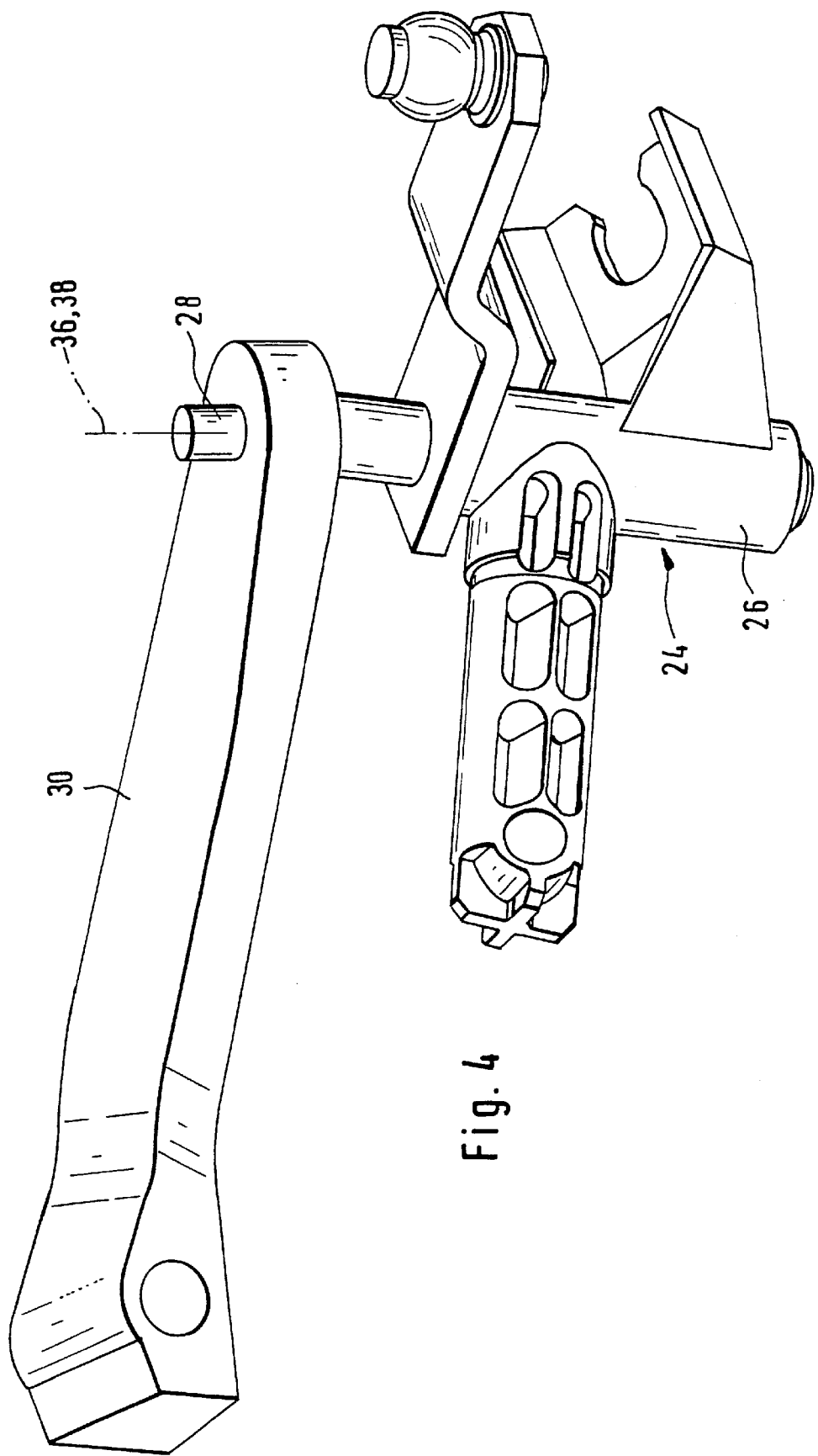

The third exemplary embodiment, shown in FIG. 4, is similar to the second exemplary embodiment; here the region 24 of the shaft 22 extends almost to the receptacle 28. The second axis 36 here coincides with the third axis 38. As a result, the tumbling motion imposed on the wiper arm 30 is less pronounced.

What is claimed is:

1. A wiper bearing, comprising a bear shell; a shaft which is received by said bearing shell; a drive mechanism to which said shaft is connected at one point, said shaft having a receptacle for a wiper arm, said bearing shell concentrically gripping a region of said shaft and forming a first axis which forms an angle with a second axis extending through a region having said receptacle of said shaft.

2. A wiper bearing as defined in claim 1, wherein said shaft is curved.

3. A wiper bearing as defined in claim 1, wherein said shaft is cranked.

4. A wiper bearing as defined in claim 1, wherein said receptacle has a third axis which forms an angle with said second axis.

* * * * *